Figure 1:
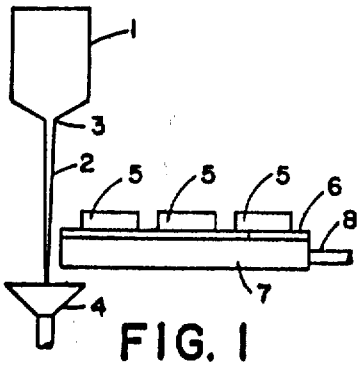
Figure 2:
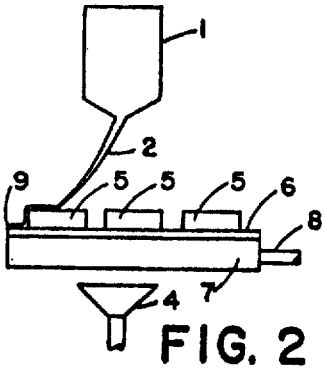
Figure 3:
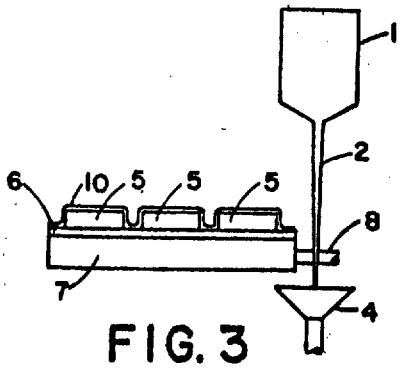
Figure 4:
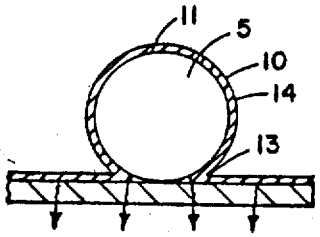
Figure 5:
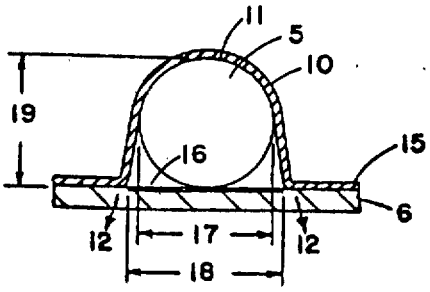
Figure 6:
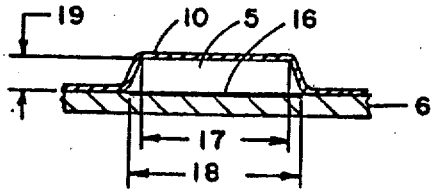
Figure 7:
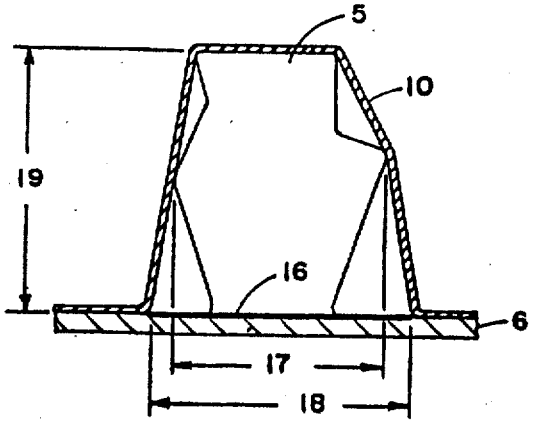
Figure 8:
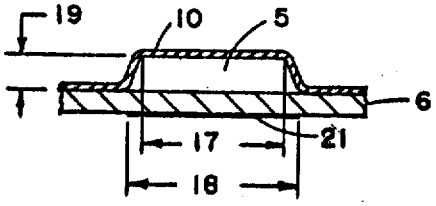

T 857004

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 42

611,202

CURTAIN COATING AN ARTICLE ON A POROUS SUBSTRATE

John J. Murphy and Ernest L. Myers, both % Tennessee Eastman Company, P.O. Box 511, Kingsport, Tenn. 37662

Filed Dec. 23, 1966. Published Dec. 3, 1968
Class 117—105.3
1 Sheet Drawing. 18 Pages Specification

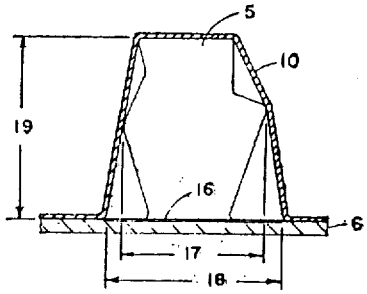

Articles are packaged on a substrate which is air-permeable except for an air impermeable area approximating the vertically downward projection of the article. The air pressure beneath the substrate is reduced and a curtain of viscous molten thermoplastic material is deposited over the article and substrate. The air impermeable area is somewhat larger than the vertical projection and is formed from an interposed sheet beneath the substrate or by impregnating the upper or lower surface of the substrate with a printing ink, paper varnish or lacquer, aqueous emulsion of a synthetic resin, resinous adhesive, or the like.

53-427 $$$ SR

M1813 XR T 857,004

T 857,004

611202

JOHN J. MURPHY
ERNEST L. MYERS
INVENTORS

BY William J. French
Charles L. Good
ATTORNEYS